United States Patent
Searcy et al.

(10) Patent No.: US 10,862,586 B1
(45) Date of Patent: Dec. 8, 2020

(54) OPTICAL LASER COMMUNICATION APPARATUS WITH ETALON-BASED OPTICAL PHASE DEMODULATION AND ASSOCIATED METHODS

(71) Applicant: BridgeComm, Inc., Denver, CO (US)

(72) Inventors: Paul Searcy, Niwot, CO (US); Barry Matsumori, Rolling Hills Estates, CA (US); Michael Morton Morrell, Frederick, CO (US); James Pete Tucker, Parker, CO (US); Ethan Earl Becker, Centennial, CO (US)

(73) Assignee: BridgeComm, Inc., Denver, CO (US)

(*) Notice: Subject to any disclaimer, the term of this patent is extended or adjusted under 35 U.S.C. 154(b) by 0 days.

(21) Appl. No.: 16/860,273

(22) Filed: Apr. 28, 2020

Related U.S. Application Data (63) Continuation-in-part of application No. 16/408,162, filed on May 9, 2019, now Pat. No. 10,637,582, and a continuation-in-part of application No. 16/294,040, filed on Mar. 6, 2019.

(60) Provisional application No. 62/661,472, filed on Apr. 23, 2018, provisional application No. 62/639,991, filed on Mar. 7, 2018.

(51) Int. Cl.
*H04B 10/00* (2013.01)
*H04B 10/118* (2013.01)
*G02F 1/1333* (2006.01)
*H04J 14/00* (2006.01)

(52) U.S. Cl.
CPC ......... *H04B 10/118* (2013.01); *G02F 1/1333* (2013.01); *G02F 2203/21* (2013.01)

(58) Field of Classification Search
CPC ... H04B 10/11; H04B 10/112; H04B 10/1121; H04B 10/1123; H04B 10/1125; H04B 10/118; H04B 10/60; H04B 10/67; H04B 10/676; H04B 10/677
See application file for complete search history.

(56) References Cited

U.S. PATENT DOCUMENTS

| | | | |
|---|---|---|---|
| 5,710,655 A * | 1/1998 | Rumbaugh | G02F 1/21 359/249 |
| 2018/0367223 A1* | 12/2018 | Graceffo | H04B 10/5561 |

* cited by examiner

*Primary Examiner* — Daniel G Dobson
(74) *Attorney, Agent, or Firm* — Patents Integrated (57) ABSTRACT

An optical receiver for use in free space communication from a transmitter to the optical receiver is configured for receiving optical signals from the transmitter. The optical receiver includes optics for collecting the optical signals, a demodulator for converting the optical signals so collected into a data stream, a signal processing unit for processing the data stream into an analog signal, and an analog-to-digital converter for converting the analog signal into a digital output. The demodulator includes a plurality of apertures and at least one Fabry-Perot etalon, through which at least a portion of the optical signals is transmitted. The demodulator also includes at least one phase detection region for detecting at least the portion of the optical signals transmitted through the at least one Fabry-Perot etalon to form a phase signal.

12 Claims, 12 Drawing Sheets

OPTICAL LASER COMMUNICATION APPARATUS WITH ETALON-BASED OPTICAL PHASE DEMODULATION AND ASSOCIATED METHODS

PRIORITY CLAIM

The present application claims the benefit of copending U.S. patent application Ser. No. 16/294,040, filed Mar. 6, 2019 and entitled "Optical Laser Communication Apparatus with Optical Phased Arrays and Coupling Arrangement and Associated Methods," and U.S. patent application Ser. No. 16/408,162, filed May 9, 2019 and entitled "Optical Laser Communication Apparatus with Etalon-Based Optical Phase Demodulation and Associated Methods," which applications are incorporated herein by reference in its entirety.

FIELD OF THE INVENTION

The present invention relates to laser communications and, more particularly, to laser communication transceivers capable of coupling light from a window into a receiver arrangement.

BACKGROUND OF THE INVENTION

Figure 1:
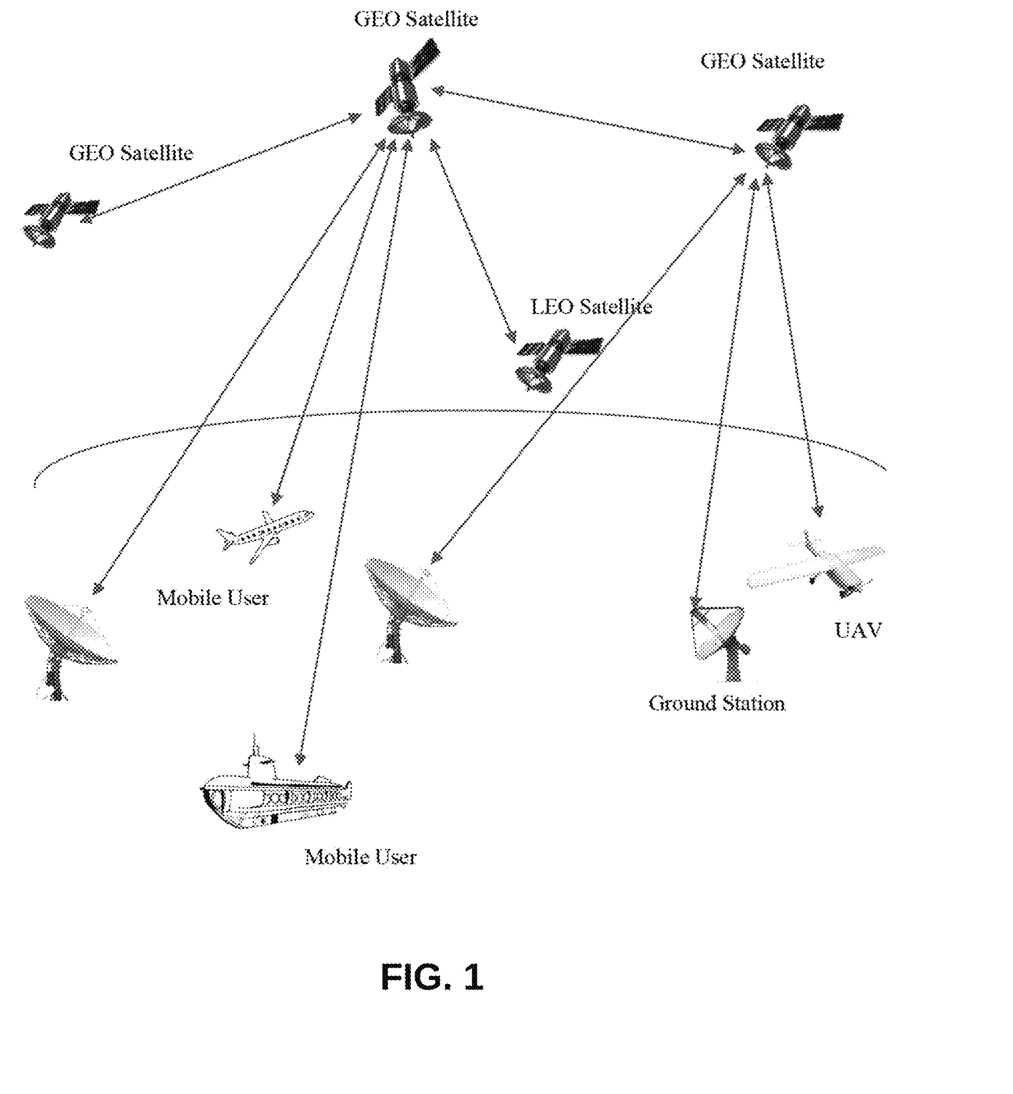
FIG. 1 illustrates a variety of communication configurations between different components that are currently available via RF communications.

Current communication systems rely on the use of radio frequencies (RF) for the data downlink from low Earth orbit (LEO) small satellite (SmallSat) or from Geosynchronous satellites (GEO). An illustration of a variety of currently available communication configurations is shown in FIG. 1. As shown in FIG. 1, communication channels between different geostationary earth orbit (GEO) satellites, between a GEO satellite and lower earth orbit (LEO) satellites, between a GEO satellite and a ground station, mobile user on an aircraft or submarine, or an unmanned autonomous vehicle (UAV) are currently possible. However, there are limitations to the data rates and data capacity of RF Small-Sats due to the frequency range and mechanical limitations of the current systems.

For example, the transceivers and ground stations of current systems require gimbals and other large mechanical means for physically scanning the field of view of the devices through a range of angles in order to be able to capture signal over those angles. This requirement is due to the fact that the currently available transceivers include a single aperture telescope for capturing and transmitting data signals therebetween. Such mechanical implementations are impractical or even detrimental for physical space and weight constrained applications such as on airplanes and UAVs.

SUMMARY OF THE INVENTION

In accordance with the embodiments described herein, an optical receiver for use in free space communication from a transmitter to the optical receiver is configured for receiving optical signals from the transmitter. The optical receiver includes optics for collecting the optical signals, a demodulator for converting the optical signals so collected into a data stream, a signal processing unit for processing the data stream into an analog signal, and an analog-to-digital converter for converting the analog signal into a digital output. The demodulator includes a plurality of apertures, each one of the plurality of apertures being optically connected with an etalon of an optical path length that is different from the optical path length of another etalon optically connected with another one of the plurality of apertures.

In another embodiment, the optical receiver includes at least three apertures.

In yet another embodiment, at least one of the etalons is formed of a uniaxial or biaxial material, and the demodulator accepts input signal over a larger range of incident angles than would be accepted by another demodulator in which all of the etalons are formed of isotropic materials.

In still another embodiment, a receiver system for use in free space communication from a plurality of transmitters to the receiver system is disclosed. The receiver system is configured for receiving optical signals from the plurality of transmitters and includes a plurality of optical receivers. Each optical receiver includes optics for collecting at least a portion of the optical signals over a range of incident angles, a demodulator for converting the optical signals so collected into a data stream, a signal processing unit for processing the data stream into an analog signal, an analog-to-digital converter for converting the analog signal into a digital output, and a fiber bundle including a plurality of optical fibers. The demodulator includes a plurality of apertures, each one of the plurality of apertures being optically connected with an etalon of an optical path length that is different from the optical path length of another etalon optically connected with another one of the plurality of apertures. The combination of optics and demodulator is configured for directing each one of the optical signals accepted at the optics to a specific optical fiber depending on the incident angle of that optical signal. Each one of the plurality of optical receivers is configured for receiving a different portion of the optical signals from the portion received by every other one of the plurality of optical receivers.

DETAILED DESCRIPTION OF EMBODIMENTS OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Space-based optical communication systems are poised to take a breakthrough role in commercial SmallSat missions. New technology developments are enabling the migration from traditional RF designs to optical communications to provide a significant leap in the data downlink and interconnection capabilities of LEO SmallSats.

A factor in the transition from RF systems to optical systems is the availability of a full turnkey solution that seamlessly connects SmallSats and high-altitude UAVs to servers on the ground, while accommodating the accelerating demand for accurate and frequent data collection from LEO SmallSats. Such an optical connectivity system will increase the speed, security, and efficiency of data transmissions from LEO SmallSats with additional capabilities beyond those provided by RF systems.

Recent innovations in optical signal transceivers, such as the incorporation of optical phased arrays, have potentially enormous benefits for integrating into existing aeronautical and space communication systems. For instance, recent improvements in optical communications include the use of phase modulation as a means of encoding data into the optical signal. One example of an optical receiver for demodulating such phase modulated optical signals is the inclusion of a Fabry-Perot etalon, which provides further improvement over other demodulation mechanisms such as local oscillators, fiber Bragg gratings, and delay line interferometers, which convert phase modulation into amplitude modulation (See, for example, U.S. Pat. App. Pub. No. 2018/0054259 A1 by Kowalevicz, et al.).

However, for optical communication systems, a greater flexibility in the range of acceptance angles for the incoming signals, as well as the ability to phase demodulate a variety of different phase modulations would be desirable.

Figure 2:
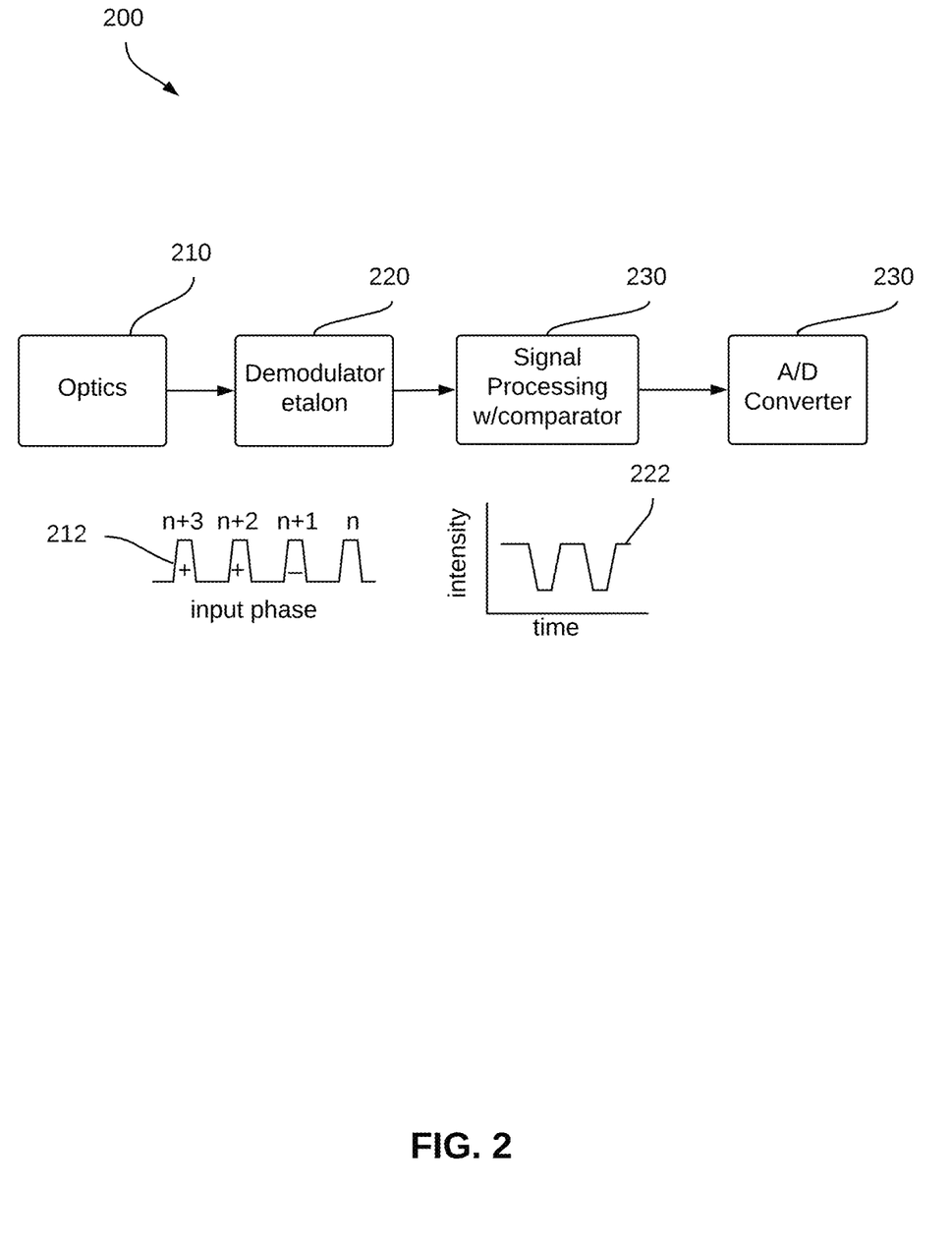
FIG. 2 shows a diagram of an optical receiver, including a demodulator etalon, in accordance with an embodiment.

Approaches to overcome such shortcomings of previous methods are disclosed herein. In an embodiment, illustrated in FIG. 2, an optical receiver 200 includes optics 210 for receiving an optical signal from an external source, such as a satellite, a ground station, mobile user, an aircraft, a submarine, or UAV. When received at optics 210, a received signal 212 includes a series of phase modulations, represented by n, n+1, etc. Optics 210 directs received signal 212 into a demodulator etalon 220, which demodulates received signal 212 and directs a demodulated signal 222 into a signal processing unit 230, which includes a comparator. Once demodulated signal has been processed, signal processing unit 230 directs a processed signal into an analog-to-digital (A/D) converter 240, which converts the processed signal into a digital data stream.

Figure 3:
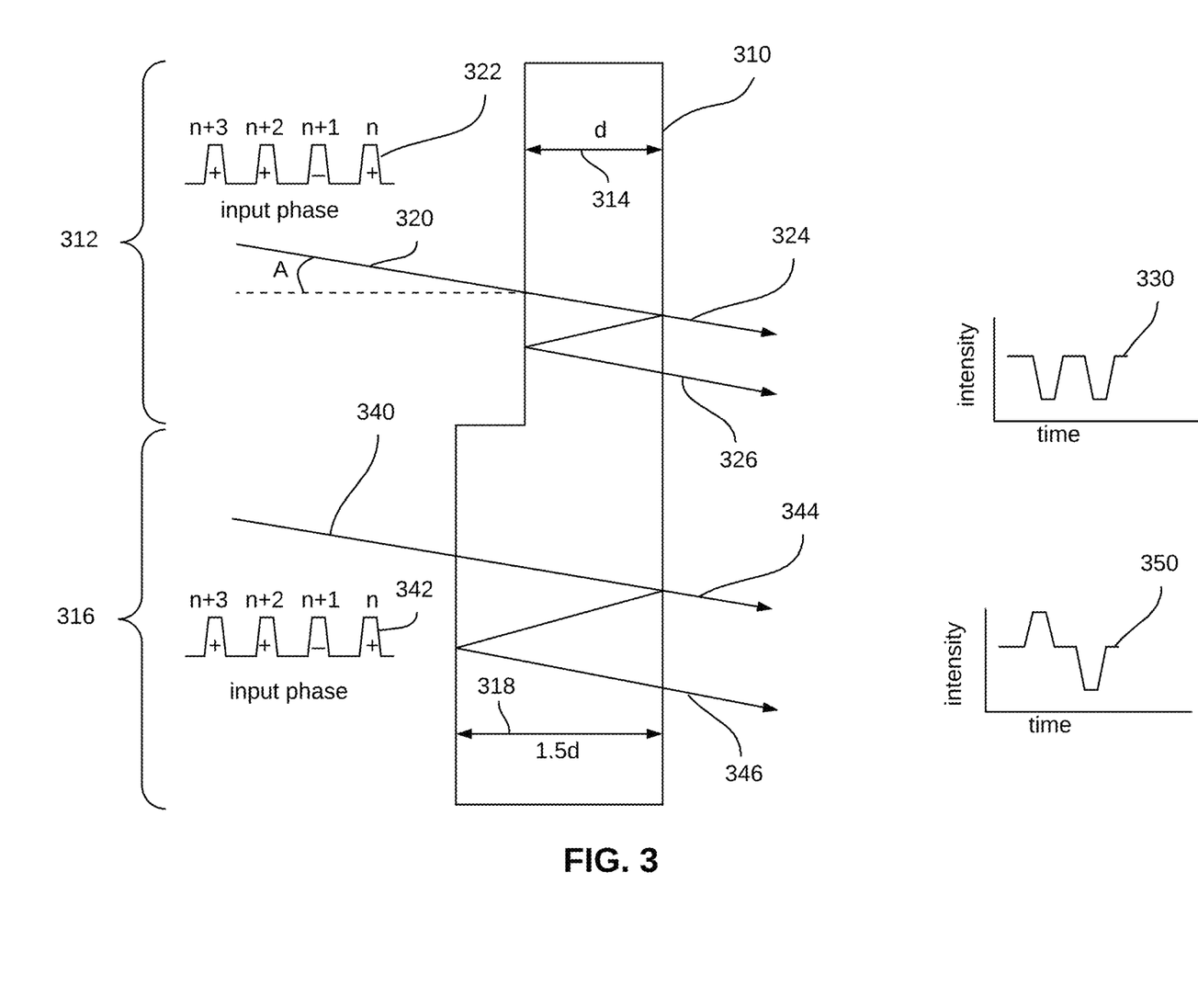
FIG. 3 shows further details of a demodulator etalon for use with the optical receiver, in accordance with an embodiment.

While a simple Fabry-Perot etalon (such as disclosed in Kowalevicz et al.) can be used as demodulator etalon 220, improvements are disclosed herein for further improving the signal demodulation properties of the demodulator etalon. An exemplary embodiment is illustrated in FIG. 3, which shows a demodulator etalon 310. Demodulator etalon 310 includes an upper section 312 with a thickness d (indicated by a double-headed arrow 314), and a lower section 316 with a thickness 1.5 d (indicated by a double-headed arrow 318). For example, a first optical signal 322 with input phases as shown (peaks n, n+2, and n+3 with + phase, and peak n+1 with − phase), is incident on upper section 312 at an incident angle A. In this case, the adjacent pulses (namely n and n+1, as well as n+2 and n+3) interfere with each other in output beams 324 and 326 so as to produce a first demodulated output 330. When a second optical signal 340, also with a similar input phase profile as first optical signal 320, is incident on lower section 316 of demodulator etalon 310, the larger thickness leads to non-adjacent pulses interfering for output beams 344 and 346, thus leading to a second demodulated output 350. It is noted that FIG. 3 is not drawn to scale.

Figure 4:
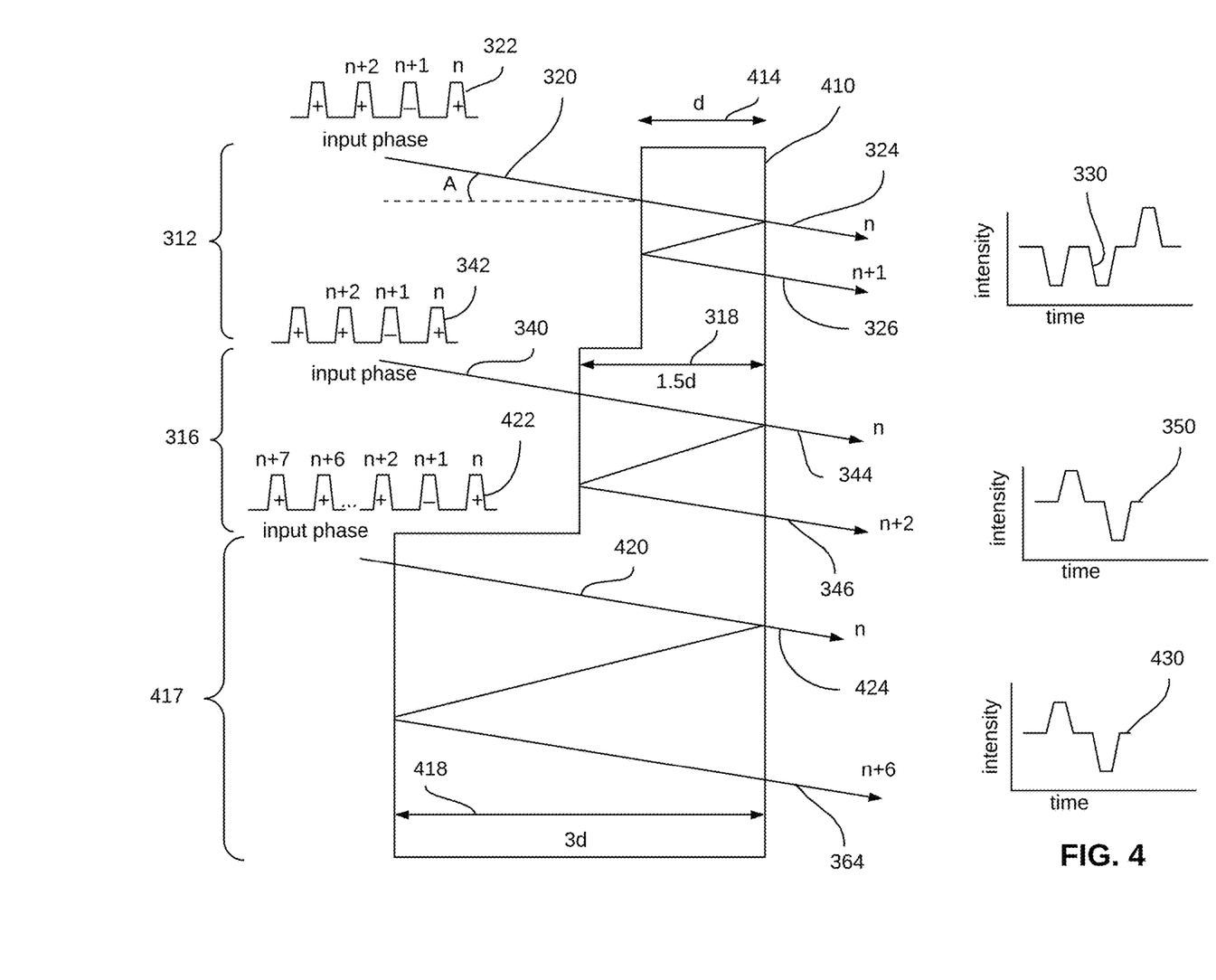
FIG. 4 shows further details of an alternative demodulator etalon for use with the optical receiver, in accordance with an embodiment.

The concept illustrated in FIG. 3 can be extended to additional thicknesses, such as in an exemplary embodiment shown in FIG. 4. In addition to upper section 312 and lower section 316 of demodulator etalon 310, a demodulator etalon 410 further includes a third section 417, with a thickness 3 d. When a third optical signal 420, with an input phase profile 422, is incident on third section 417, output beams 364 and 366 are such that n and n+6 phase pulses are interfered for output beams 424 and 426, thus resulting in a third demodulated output 430.

The embodiments illustrated in FIGS. 3 and 4 are dependent on the thickness differences in different sections of demodulator etalons 310 and 410, respectively, resulting in differences in optical path lengths traveled by optical signals incident thereon. Thus, by modifying the thicknesses (and thus the effective optical path lengths) in different sections of the demodulator etalon, different portions of the input pulses can be interfered. This technique enables encoding of different layers of data in the same set of input pulses, resulting in different information extracted by interfering adjacent pulses, non-adjacent pulses, etc. Furthermore, the effective optical path lengths through different sections of the demodulator etalons can be tuned in real time if, for instance, one or more sections of the demodulator etalon is formed of a liquid crystal layer or another electro-optic material for tunability. Such tunable devices can also be used to compensate for demodulator etalon thickness changes when exposed to variable temperatures.

Figure 5:
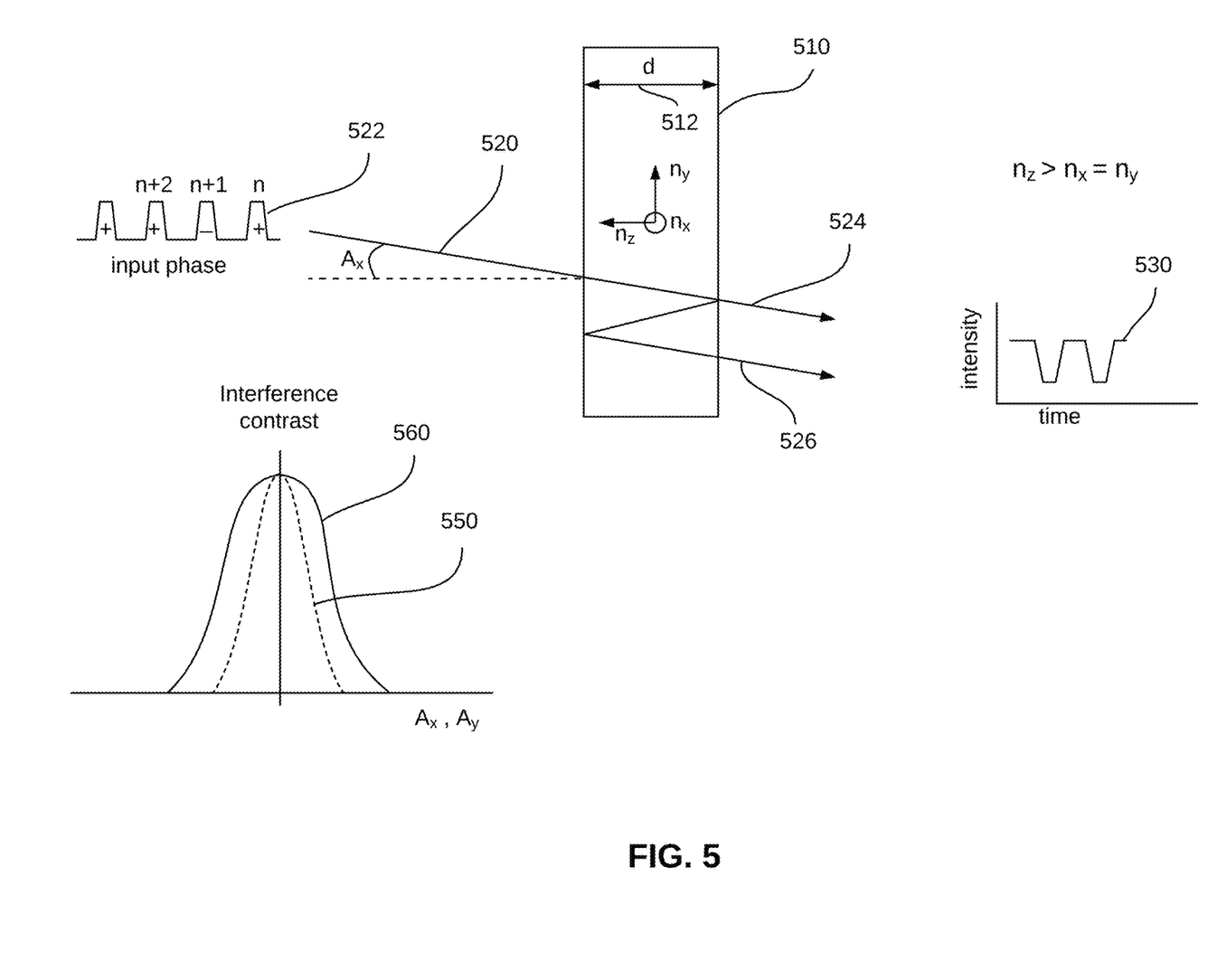
FIG. 5 shows another alternative demodulator etalon for use with the optical receiver, in accordance with an embodiment.
Figure 6:
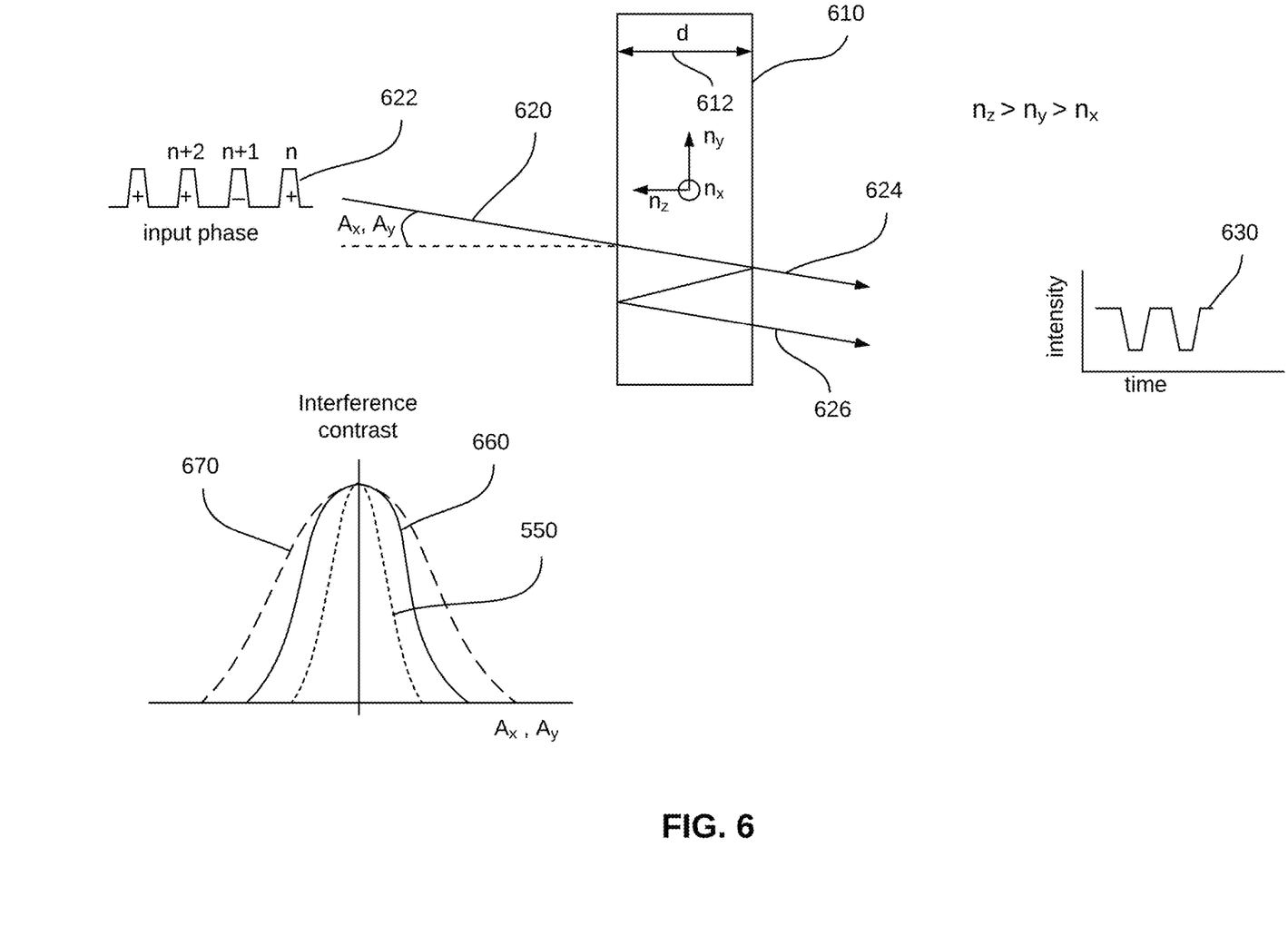
FIG. 6 shows still another alternative demodulator etalon for use with the optical receiver, in accordance with an embodiment.

Additional embodiments are illustrated in FIGS. 5 and 6, which rely on material properties of the demodulator etalon rather than thickness differences to provide improved performance over previous demodulator etalons. In particular, FIG. 5 shows a demodulator etalon 510 with a thickness d (indicated by a double-headed arrow 512). In accordance with an embodiment, demodulator etalon 510 is formed of a uniaxial material exhibiting directionally-dependent indices of refraction. For instance, in the embodiment shown in FIG. 5, demodulator etalon exhibits an index of refraction $n_x$ along an x-axis, an index of refraction $n_y=n_x$ along a y-axis, and an index of refraction $n_z$, which is not equal to $n_x$ nor $n_y$, along a z-axis, as shown in FIG. 5. Consequently, the index of refraction seen by an optical signal 520 is dependent on an incident angle A (i.e., index of refraction=n(A)). For instance, for $n_z > n_x = n_y$, optical signal 520 with input phase 522 can result in a demodulated output 530, which is essentially the same as the effect of the upper section of demodulator etalon 310 of FIG. 3. However, for other incident angles in the x- and y-directions, the angle dependence of the index of refraction results in an improved interference contrast performance over a wider range of incident angles than a demodulator etalon with an isotropic material. As an illustration, if the interference contrast performance of an isotropic demodulator etalon is represented by a curve 550, the interference contrast performance of demodulator etalon 510 is represented by a curve 560, showing improved interference contrast over a wider range of incident angles in the x- and y-directions.

The concept can be expanded to a demodulator etalon 610 formed of a biaxial material, such as shown in FIG. 6. For instance, if the directionally-dependent indices of refraction are such that $n_z > n_y > n_x$, then the angular dependence of the interference contrast can be represented by curves 660 and 670 in the x- and y-directions, respectively. Suitable biaxial materials include, for instance, liquid crystals, meta materials, calcite, and quartz.

Optionally, demodulation etalon 510 and 610 can be formed of a liquid crystal or another electro-optical material that is tunable by voltage application thereto. Such tunability is useful for, for example, to compensate for thickness changes in the demodulator etalon due to thermal expansion. The tuning of the material properties of the demodulator etalon can be combined with modulation of the pulse rate of the optical input phase for further compensation.

Figure 7:
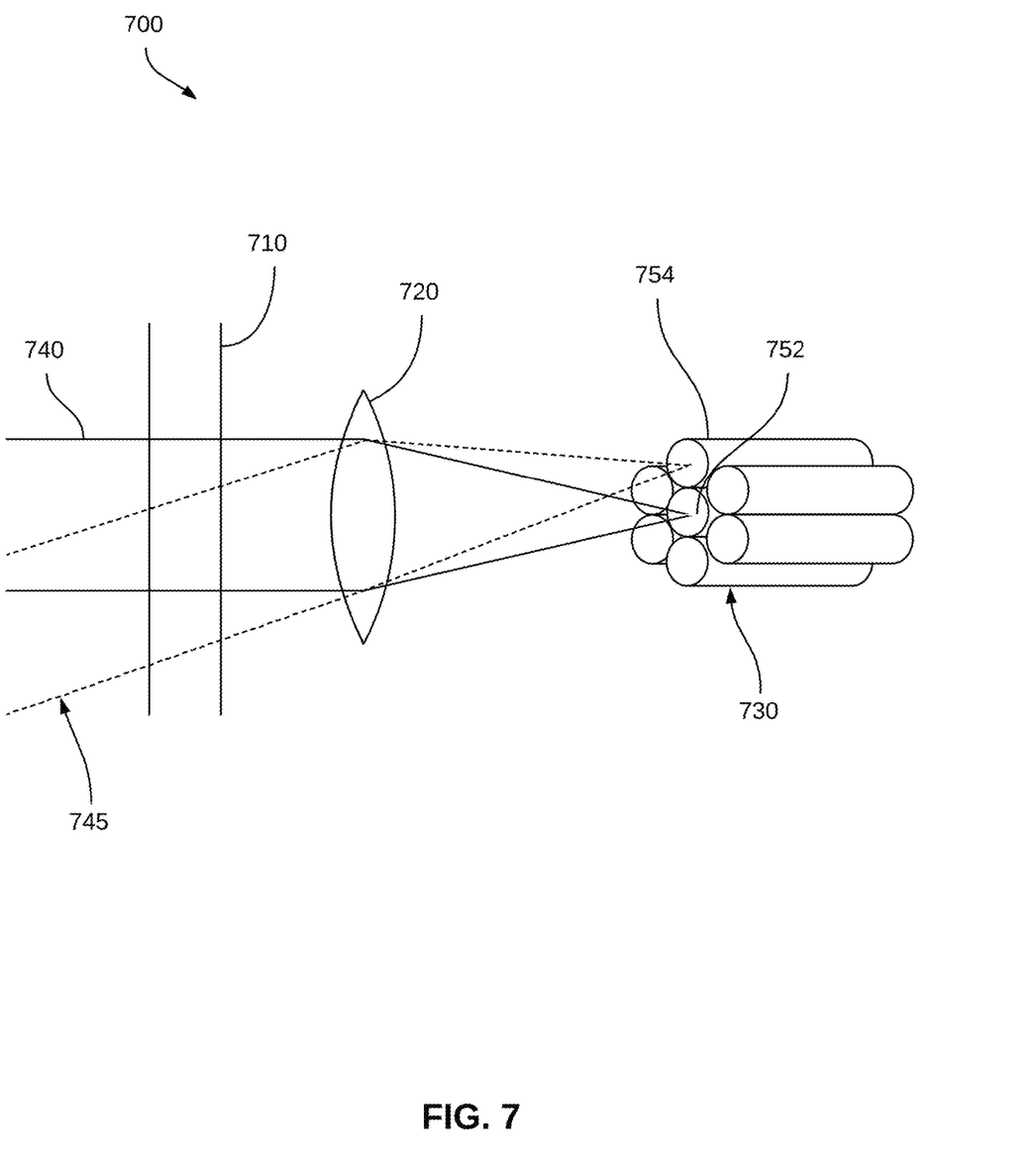
FIG. 7 shows an exemplary configuration of a demodulator etalon, in accordance with an embodiment.

An application of a demodulator etalon 710 with angular dependent performance is shown in FIG. 7. One or more optical components (represented by a lens 720) is used in conjunction with demodulator etalon to focus light exiting demodulator etalon 710 onto different portions of a fiber bundle 730. For example, a first light beam 740 (represented by solid lines) incident on demodulator etalon 710 is directed by lens 720 onto a first fiber 752. A second light beam 745 (represented by dashed lines), which is incident an off-axis angle onto demodulator etalon 710, is directed by lens 720 onto a second fiber 754. First and second light beams 740 and 745, respectively, can include different data sets such that the combination of demodulator etalon 710 and lens 720 result in different sets of data being delivered to different fibers within a fiber bundle. Thus, by combining a plurality of such combinations of optics, demodulator etalons, and fiber bundles, the field of view of the receiver system as a whole can be increased. Alternatively, optical signals from different, angularly separated transmitters can be simultaneously received at the receiver system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Figure 8:
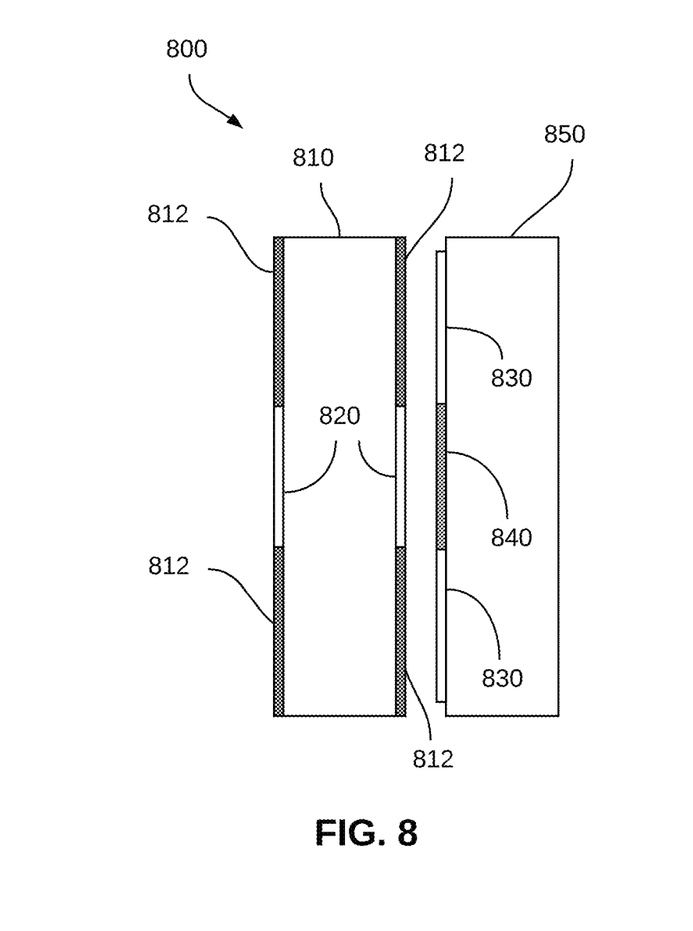
FIGS. 8 and 9 show a cross-sectional view and an exploded view, in perspective, of an exemplary configuration of another optical receiver including an alternative demodulator etalon arrangement, in accordance with an embodiment.
Figure 9:
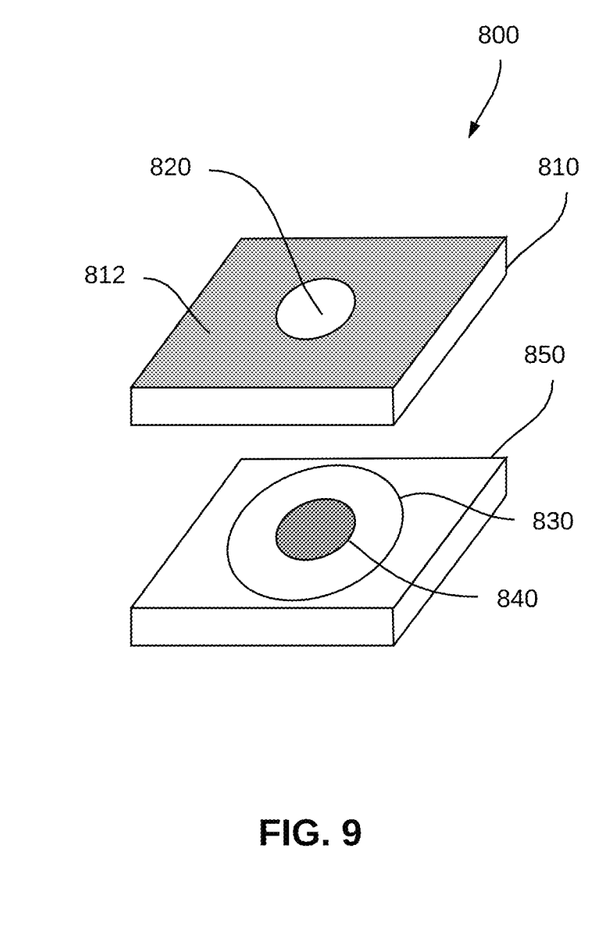

Further examples of optical receivers including demodulation etalon arrangements are described in FIGS. 8-14. Referring first to FIGS. 8 and 9, FIGS. 8 and 9 show a cross-sectional view and an exploded view, in perspective, of an exemplary configuration of another optical receiver including an alternative demodulator etalon arrangement, in accordance with an embodiment.

As shown in FIG. 8, an optical receiver 800 includes a first substrate 810. First substrate 810 is formed of a material substantially transparent to the wavelength of the optical signal of interest. The material forming first substrate 810 may be formed of, for example, optical glass or any other material with the appropriate transmission characteristics to transmit the optical signal of interest therethrough. A portion of the opposing flat surfaces of first substrate 810 is coated with an etalon coating 812 for partially reflecting the input optical signal (not shown). Etalon coating 812 is formed of, for instance, one or more layers of dielectrics configured for partially reflecting the input optical signal. For example, an alternating stack of high and low refractive index materials (e.g., zinc sulfide or titanium oxide as the high index material, and magnesium fluoride or silicon dioxide as the low index material) can be used to form etalon coating 812. Etalon coating 812 should have a reflectivity in the range of 30% to 90%. Reflectivity properties of etalon coatings 812 on the opposing flat surfaces of first substrate 810 are matched such that etalon coatings 1012 form essentially a Fabry-Perot cavity separated by the thickness of first substrate 810. The Fabry-Perot cavity provides interactions between time delayed pulses of photons contained therein, thus converting the phase relationships of the pulses into easily measured intensity changes. The transmission characteristics of the Fabry-Perot cavity are adjustable by selecting the desired thickness and refractive index of first substrate 810.

Still referring to FIG. 8, another portion of the opposing flat surfaces of first substrate 810 is optionally coated with an antireflection (AR) coating 820 for efficiently transmitting the input optical signal therethrough. AR coating 820 can be formed of, for instance, one or more dielectric layers arranged to transmit 90%+ of the input signal therethrough.

Continuing to refer to FIG. 8, a phase signal detection area 830 and an amplitude signal detection area 840 are supported on a second substrate 850. Phase signal detection area 830 and amplitude signal detection area 840 are electrically isolated such that each one of phase and amplitude signal detection areas can be individually addressed electronically (not shown) and the phase and amplitude signals detected in these areas can be separately detected. Amplitude signal detection area 840 is located coaxially with AR coating 820 on first substrate 810 such that optical signals transmitted through AR coating 820 can be detected on amplitude signal detection area 840. Similarly, optical signals transmitted through etalon coating 812 can be sampled on phase signal detection area 830. The exploded perspective view shown in FIG. 9 offers an alternative view of optical receiver 800.

While FIGS. 8 and 9 show optical receiver 800 having an annular etalon coating and detector arrangement, other configurations of the etalon coatings and detector arrangements are possible. For instance, a pixelated arrangement of etalon coatings are suitable for certain applications in which an array of detectors is used for detecting optical signals transmitted through different etalon "pixels."

Figure 10:
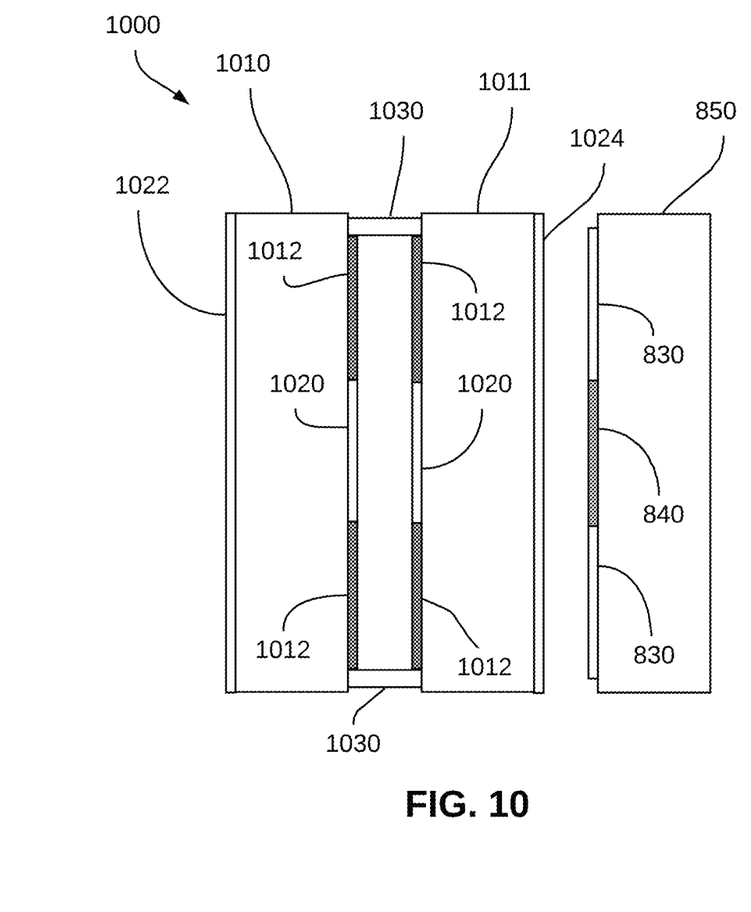
FIG. 10 shows a cross-sectional view of another optical receiver including still another alternative demodulator etalon arrangement, in accordance with an embodiment.
Figure 11:
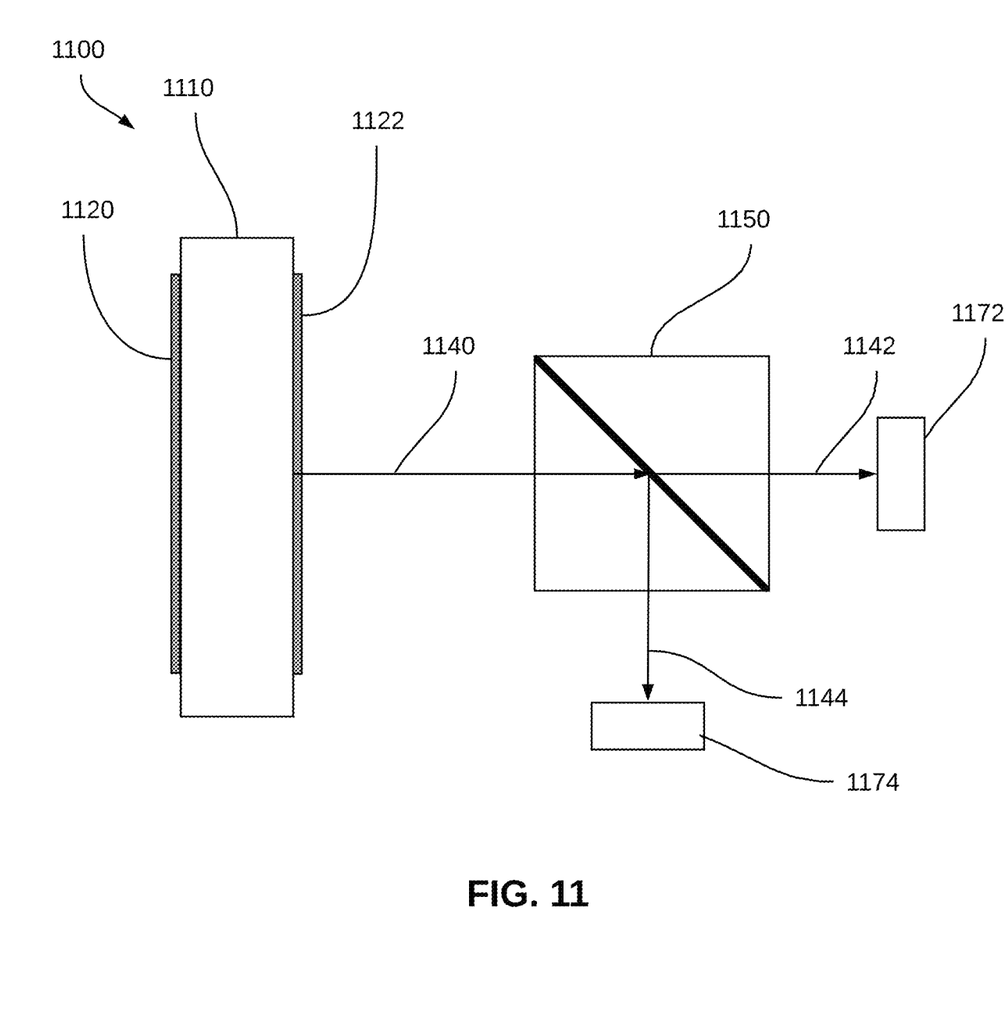
FIG. 11 shows a cross-sectional view of another example of an optical receiver including a demodulator etalon arrangement, further including a beam splitter and a pair of detectors, in accordance with an embodiment.

FIG. 10 shows a cross-sectional view of another optical receiver including still another alternative demodulator etalon arrangement, in accordance with an embodiment. Optical receiver 1000 includes a first substrate 1010 as well as second substrate 850, and phase and amplitude signal detection areas 830 and 840, respectively, similarly to optical receiver 800 as shown in FIG. 8. Optical receiver 1000 also includes a third substrate 1011. Each of the flat, facing surfaces of first and third substrates 1010 and 1011, respectively, include etalon coatings 1012, and AR coatings 1020. Third substrate 1011 also includes a front coating 1022. First substrate 1010 also includes a back coating 1024. Front coating 1022 and back coating 1024 can be another AR coating for efficiently transmitting incident optical signal therethrough. Reflectivity properties of etalon coatings 1012 on first and third substrates 1010 and 1011 are matched such that etalon coatings 1012 on facing surfaces of first and third substrates 1010 and 1011, respectively, form essentially an air gap etalon or a Fabry-Perot cavity. The transmission characteristics of the Fabry-Perot cavity formed between first and third substrates 1010 and 1011, respectively, are adjustable by adjusting the distance between the opposing etalon coatings defined by spacers 1030. Spacers 1030 are formed of, for example, spacer beads, deposited features, or other structures configured to separate the facing etalon coatings 1012 at a desired distance from each other. As another example, spacers 1030 are formed of a tunable material, such as a piezoelectric material, such that spacers 1030, and consequently the spacing between etalon coatings 1012 on facing surfaces of first and third substrates 1010 and 1011 as well as the characteristics of the resulting air gap etalon, are tunable FIG. 11 shows a cross-sectional view of another example of an optical receiver including a demodulator etalon arrangement, further including a beam splitter and a pair of detectors, in accordance with an embodiment. As shown in FIG. 11, an optical receiver 1100 includes a substrate 1110 on which first and second etalon coatings 1120 and 1122, respectively, are deposited on opposing surfaces of substrate 1110. Optionally, substrate 1110 is at least partially formed of a uniaxial or biaxial material, such as discussed above, so as to provide a polarization-dependent refraction for optical signal transmitted therethrough. Additionally, substrate 1110 can be mounted on a rotatable mount such that, by rotating substrate 1110 formed of a uniaxial or biaxial material, optical signal transmission therethrough can be modified, depending on the polarization dependence of the input optical signal An optical signal, after passing through substrate 1110 and first and second etalon coatings 1120 and 1122, respectively, emerges as a light signal 1140. Light signal 1140 is split into first and second orthogonal signals 1142 and 1144, respectively, by a beam splitter 1150. First orthogonal signal 1142 is then detected at a first detector 1172, and second orthogonal signal 1144 is detected at a second detector 1174. For example, beam splitter 1150 is a polarization beam splitter, which splits light signal 1140 into first and second orthogonal signals 1142 and 1144, respectively, having orthogonal polarization states, according to the polarization components contained within light signal 1140. As an example, if different information is encoded into the orthogonal polarization states in light signal 1140, the information can be split and decoded separately at first and second detectors 1172 and 1174, thus effectively doubling the data carrying capacity of light signal 1140.

In an embodiment, first and second etalon coatings 1120 and 1122 are each split into first and second sections 1120A and 1120B, and 1122A and 1122B, respectively. First sections 1120A and 1122A can have a first etalon characteristic, while second sections 1120B and 1122B can have a second etalon characteristic such that light transmitted through a Fabry Perot etalon formed by first sections 1120A and 1122A experiences a different optical path length compared to if the same light were transmitted through a Fabry Perot etalon formed by second sections 1120B and 1122B. That is, even within a thin film configuration as shown in FIG. 11, an effect similar to those shown in FIGS. 3 and 4 can be achieved. Similar modifications can be made to other etalon configurations illustrated herein to split the various etalon configurations into sections with different effective optical path lengths depending on the specific area of the etalon configuration onto which the input optical signal is incident.

Figure 12:
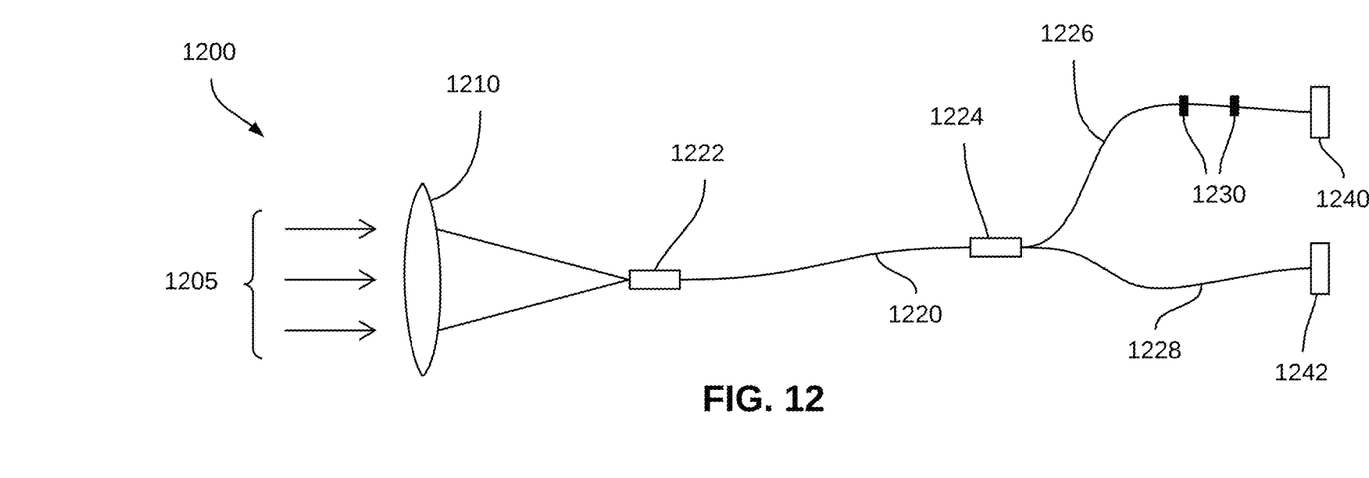
FIG. 12 shows a waveguide-based optical receiver including a demodulator etalon arrangement, in accordance with an embodiment.

Still another embodiment of an optical receiver is shown in FIG. 12. FIG. 12 shows a waveguide-based optical receiver 1200 including a demodulator etalon arrangement, in accordance with an embodiment. Optical receiver 1200 is configured for receiving light rays 1205, which are focused by optics 1210 and transmitted into a waveguide 1220 via an input 1222. While optics 1210 is represented by a single lens in FIG. 12, optics 1210 can include a plurality of optical components serving to transmit light rays 1205 into waveguide 1220. Waveguide 1220 can be, for instance, an optical fiber, and input 1222 can be, for example, a fiber ferrule. In other embodiments, waveguide 1220 is a solid state waveguide, and input 1222 is an optical coupler.

Continuing to refer to FIG. 12, a splitter 1224 splits light signal traveling through waveguide 1220 into first and second light paths 1226 and 1228, respectively. First light path 1226 includes a pair of Bragg gratings 1230, which together form an etalon arrangement, after which the signal traveling through first light path 1226 is detected at a first detector 1240. Signal traveling through second light path 1228 is detected at a second detector 1242.

Figure 13:
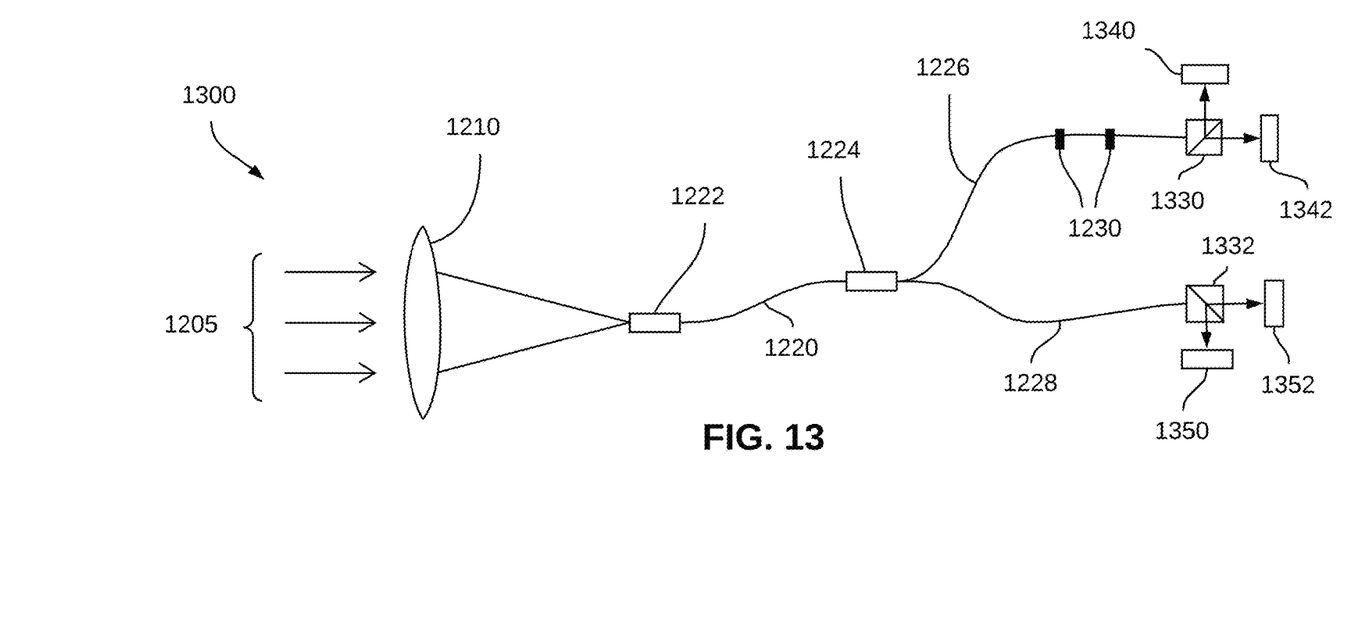
FIG. 13 shows another embodiment of the waveguide-based optical receiver, including a pair of beam splitters and multiple detectors for detecting different components of the input light.

FIG. 13 shows another embodiment of the waveguide-based optical receiver, including a pair of beam splitters and multiple detectors for detecting different components of the input light. In addition to the components shown in FIG. 12, an optical receiver 1300 includes first and second beam splitters 1330 and 1332, respectively, for receiving signals traveling through first and second light paths 1226 and 1228, respectively. Like the beam splitter shown in FIG. 12, first and second beam splitters 1330 and 1332, respectively, split light incident thereon into, for example, orthogonal polarization components to be detected at separate detectors 1340, 1342, 1350, and 1352. Orthogonal polarization components can be, for example, left- and right-handed circular polarization states or vertical and horizontal linear polarization states.

Figure 14:
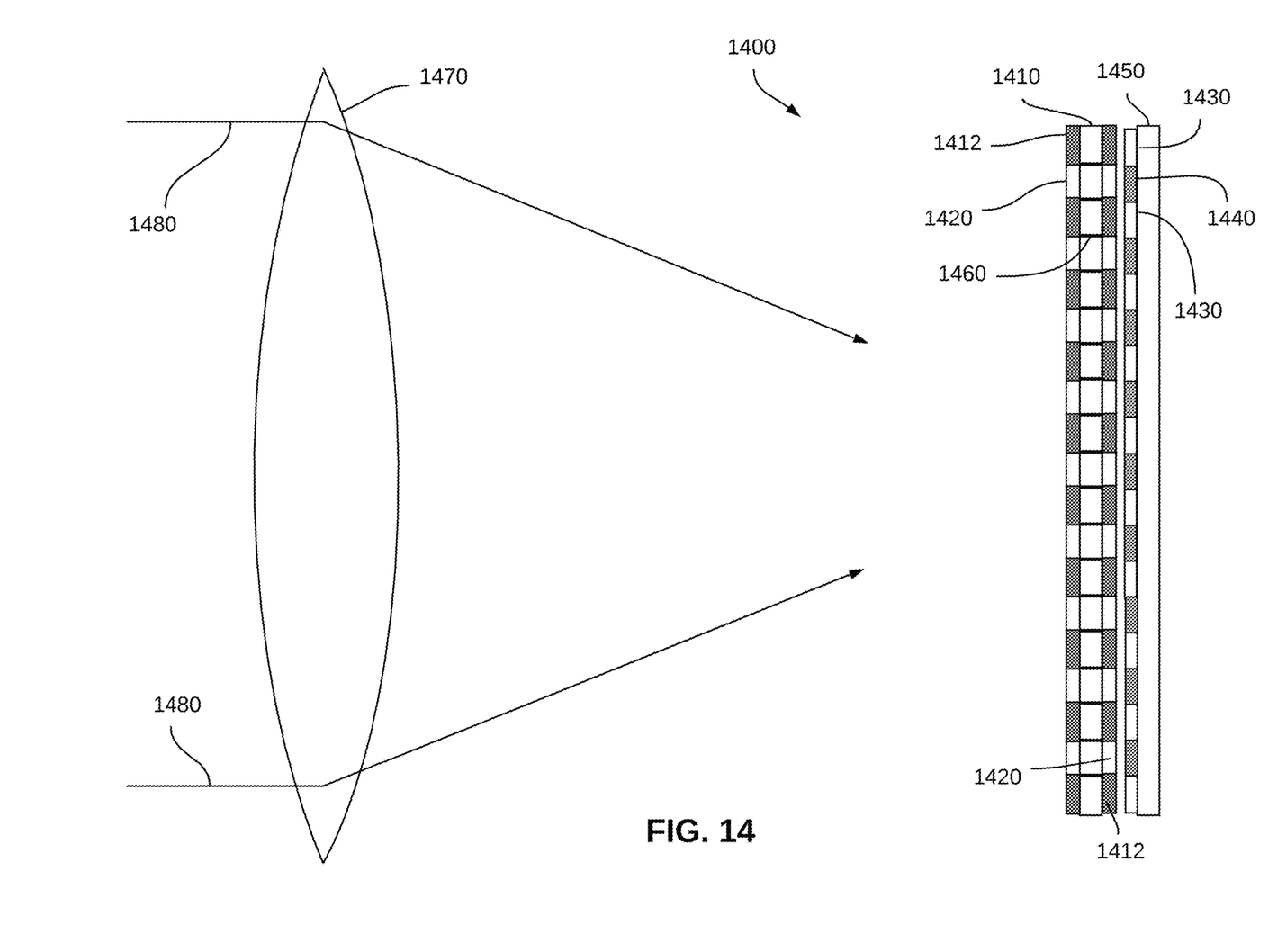
FIG. 14 shows an exemplary configuration of an optical receiver array, including a demodulator etalon arrangement, in accordance with an embodiment.

Referring now to FIG. 14, an exemplary configuration of an optical receiver array 1400, including a demodulator etalon arrangement, in accordance with an embodiment, is described. Optical receiver array 1400 includes a first substrate 1410 including a plurality of etalon coatings 1412 separated by a plurality of AR coatings 1420. Etalon coatings 1412 and AR coatings 1420 are arranged, in an example, in concentric annular rings on opposing flat sides of first substrate 1410 such that etalon coatings 1412 on opposing flat sides of first substrate 1410 form annular etalon rings. Alternatively, etalon coatings 1412 and AR coatings 1420 are arranged in alternating squares, forming an array of etalon pixels separated by AR coated transmission areas.

Optical receiver array 1400 further includes a plurality of phase signal detection areas 1430 separated by a plurality of amplitude signal detection areas 1440 supported on a second substrate 1450. Phase and amplitude signal detection areas 1430 and 1440, respectively, are arranged to correspond to the configuration of the etalon coatings 1412 and AR coatings 1420 on first substrate 1410. That is, if etalon coatings 1412 and AR coatings 1420 are configured as concentric annular rings on first substrate 1410, then phase signal detection areas 1430 and amplitude signal detection areas 1440 are also arranged as concentric annual rings on second substrate 1450.

First substrate 1410 further includes a plurality of internal, light-blocking walls 1460 so as to direct phase signals from the etalon rings or pixels into corresponding phase signal detection areas 1430, while optical signals transmitted through each AR coating on first substrate 1410 are transmitted into a corresponding amplitude signal detection area 1440, thus reducing crosstalk between the detection of phase and amplitude signals. In this way, when optics 1470 directs an input optical signal (represented by arrows 1480) toward optical receiver array 1400, then both phase and amplitude information regarding input optical signal 1480 is received by optical receiver array 1400. While optics 1470 is represented by a single lens in FIG. 14, optics 1470 can include a plurality of optical components serving to transmit light rays 1480 toward optical receiver array 1400.

It should be noted that, with optical receiver array 1440, the various etalon coatings on first substrate 1410 do not need to be identical. For example, by modifying the reflectivity characteristics of different concentric rings of etalon coatings, Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or sub combination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An optical receiver for use in free space communication from a transmitter to the optical receiver, the optical receiver being configured for receiving optical signals from the transmitter and comprising:

optics for collecting the optical signals;
a demodulator for converting the optical signals so collected into a data stream;
a signal processing unit for processing the data stream into an analog signal; and
an analog-to digital converter for converting the analog signal into a digital output,
wherein the demodulator includes a plurality of apertures;
wherein the demodulator includes at least one Fabry-Perot etalon through which Fabry Perot etalon at least a portion of the optical signals is transmitted;
wherein the demodulator includes at least one phase detection region for detecting the at least the portion of the optical signals transmitted through the at least one Fabry-Perot etalon to form a phase signal in the data stream, and
wherein the Fabry-Perot etalon includes a biaxial material.

2. The optical receiver of claim 1, wherein the demodulator includes at least one amplitude detection region for detecting the optical signal not transmitted through the at least one Fabry-Perot etalon to form an amplitude signal in the data stream.

3. The optical receiver of claim 1, wherein the Fabry-Perot etalon is tunable.

4. The optical receiver of claim 1, wherein the Fabry-Perot etalon includes a uniaxial material.

5. The optical receiver of claim 4, wherein the uniaxial material is a liquid crystal.

6. The optical receiver of claim 1, wherein the demodulator accepts input signal over a larger range or incident angles than would be accepted by another modulator in which the Fabry-Perot etalon is formed of isotropic materials.

7. An optical receiver for use in free space communication from a transmitter to the optical receiver, the optical receiver being configured for receiving optical signals from the transmitter and comprising:

optics for collecting the optical signals;
a demodulator for converting the optical signals so collected into a data stream;
a signal processing unit for processing the data stream into an analog signal; and
an analog-to digital converter for converting the analog signal into a digital output,
wherein the demodulator includes a plurality of apertures,
wherein the demodulator includes at least one Fabry-Perot etalon through which Fabry Perot etalon at least a portion of the optical signals is transmitted,
wherein the demodulator includes at least one phase detection region for detecting the at least the portion of the optical signals transmitted through the at least one Fabry-Perot etalon to form a phase signal in the data stream, and
wherein the demodulator accepts input signal over a larger range or incident angles than would be accepted by another modulator in which the Fabry-Perot etalon is formed of isotropic materials.

8. The optical receiver of claim 7, wherein the demodulator includes at least one amplitude detection region for detecting the optical signal not transmitted through the at least one Fabry-Perot etalon to form an amplitude signal in the data stream.

9. The optical receiver of claim 7, wherein the Fabry-Perot etalon is tunable.

10. The optical receiver of claim 7, wherein the Fabry-Perot etalon includes a uniaxial material.

11. The optical receiver of claim 10, wherein the uniaxial material is a liquid crystal.

12. The optical receiver of claim 7, wherein the Fabry-Perot etalon includes a biaxial material.

* * * * *